United States Patent
Burson (10) Patent No.: US 7,567,828 B1
(45) Date of Patent: Jul. 28, 2009

(54) LOOK AND TUNE MOBILE COMMUNICATION DEVICE

(75) Inventor: Steven F. Burson, Darby, MT (US)

(73) Assignee: Plantronics, Inc., Santa Cruz, CA (US)

( * ) Notice: Subject to any disclaimer, the term of this patent is extended or adjusted under 35 U.S.C. 154(b) by 382 days.

(21) Appl. No.: 11/173,363

(22) Filed: Jul. 1, 2005

(51) Int. Cl.
*H04M 1/00* (2006.01)

(52) U.S. Cl. .............. 455/575.2; 455/575.5; 455/575.6; 455/575.7; 455/569.1; 381/309; 381/311; 381/313; 381/355; 381/356

(58) Field of Classification Search .............. 455/575.1, 455/575.2, 575.6, 575.7, 575.9, 558, 557, 455/569.1; 379/309, 311, 313, 355, 356
See application file for complete search history.

(56) References Cited

U.S. PATENT DOCUMENTS

| | | | | |
|---|---|---|---|---|
| 5,991,645 A | * | 11/1999 | Yuen et al. | 455/575.2 |
| 6,006,115 A | * | 12/1999 | Wingate | 455/575.2 |
| 6,396,612 B1 | * | 5/2002 | Bjorndahl | 398/121 |
| 6,426,819 B1 | * | 7/2002 | Crimmins et al. | 398/99 |
| 6,492,933 B1 | * | 12/2002 | McEwan | 342/28 |
| 2002/0115479 A1 | * | 8/2002 | Tischler | 455/568 |
| 2002/0119808 A1 | * | 8/2002 | Seiki | 455/575 |
| 2005/0272477 A1 | * | 12/2005 | Boykins et al. | 455/569.1 |
| 2006/0095339 A1 | * | 5/2006 | Hayashi et al. | 705/26 |
| 2006/0281477 A1 | * | 12/2006 | Downes | 455/509 |

* cited by examiner

*Primary Examiner*—Vincent P Harper
*Assistant Examiner*—Dung Lam
(74) *Attorney, Agent, or Firm*—Thomas C. Chuang (57) ABSTRACT

Systems and methods for a mobile communication device are disclosed. The system generally includes a housing such as a headset, a speaker, a microphone, and a wireless communication module. The wireless communications module provides for directional communication links.

11 Claims, 6 Drawing Sheets

LOOK AND TUNE MOBILE COMMUNICATION DEVICE

BACKGROUND OF THE INVENTION

As wireless systems become ubiquitous, problems arise with multiple wireless networks and devices occupying the same space. Interference between systems becomes problematic, with reduced range and audio quality being two noticeable effects.

One technique to increase the operable density of wireless devices is to utilize devices with a shorter working range. The power in these devices can be reduced to appropriate levels and the effective density can be increased. The Bluetooth standard is an example of a local area wireless network with relatively short range devices. Bluetooth is a radio-frequency protocol which allows electronic devices to connect to one another over short-range radio links. Bluetooth devices operate in the ISM (industrial, scientific, medical) band at about 2.4 to 2.5 GHz, and have a range limited to about 10 meters. Spread spectrum frequency hopping limits interference from other devices using the ISM bandwidth. Another example of ultra short range devices is the Near Field Consortium (NFC) technology. NFC has a working range so short that it uses the proximity of the devices for security and for tuning or device selection.

The use of multiple short range wireless devices providing a wide variety of applications and services presents users with the problem of selecting which devices they wish to interact with for a given application. This presents complex Man Machine Interface (MMI) scenarios.

In certain applications, such as certain NFC technology applications, the user can employ device proximity to enable desired links between devices, allowing the MMI to be relatively simple. However, in many applications the effective range of the device is longer than can be managed solely with device proximity and there are many possible devices that can interact. The user must manually select the desired device to connect to from a large number of devices. This becomes problematic when the user input device is very simple with little user I/O functionality.

As a result, there is a need for improved methods and apparatuses for wireless mobile communication devices.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Methods and apparatuses for wireless mobile communication devices are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Generally, this description describes a method and apparatus for a wireless mobile communication device such as a headset which forms selected directional links with a target device among several potential target devices (referred to by the inventor as a "look and tune" function in one example). The present invention is applicable to a variety of different types of mobile communication devices in addition to headsets, including cell phones, personal digital assistants (PDAs), and wrist-worn devices. While the present invention is not necessarily limited to such devices, various aspects of the invention may be appreciated through a discussion of various examples using this context.

According to an example embodiment of the present invention, a wireless headset includes a directional wireless antenna correlated with the headset boom such that wireless links may be formed by altering the direction the boom is projecting. The directional antenna beam enhances the formation of a desired link where there are multiple links in close proximity which may be formed with the wireless headset. In one example mode of operation, the wireless headset includes a diversity antenna. In a further example, the wireless headset includes more than wireless communication module.

Figure 1:
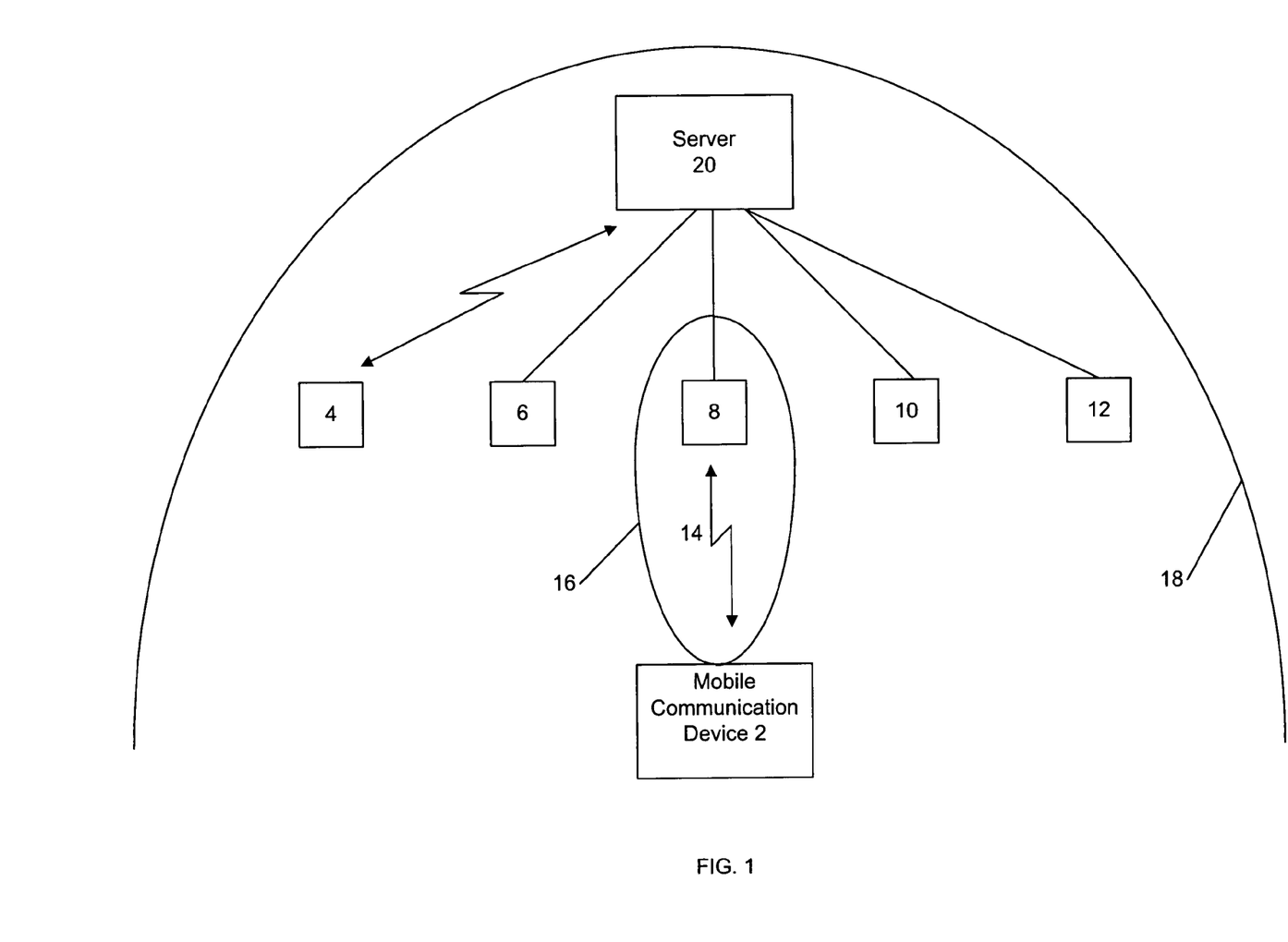
FIG. 1 illustrates a system view of a mobile communication device in use in one example of the invention.

FIG. 1 illustrates a system view of a mobile communication device in use in one example application. A mobile communication device 2 is in proximity to a plurality of target devices 4, 6, 8, 10, and 12 with wireless communication functionality. The number of target devices illustrated is for example only, and fewer or greater devices may be used. Target devices 4, 6, 8, 10, and 12 are any devices the user wishes to establish wireless communications with. Target devices 4, 6, 8, 10, and 12 may, for example, be networked electronic devices capable of transmitting data such as voice or text data to mobile communication device 2. For example, target devices 4, 6, 8, 10, and 12 may be connected via a wireless or wired connection to a server 20 or communication network. Mobile communication device 2 may establish a wireless link 14 with a single target device using a directional wireless transmission 16. Mobile communication device 2 may establish a wireless link with a plurality of target devices using an omni-directional wireless transmission 18. For example, mobile communication device 2 may be body worn or handheld. Mobile communication device 2 includes internal components which are described below in reference to FIG. 2 and FIG. 3.

Figure 2:
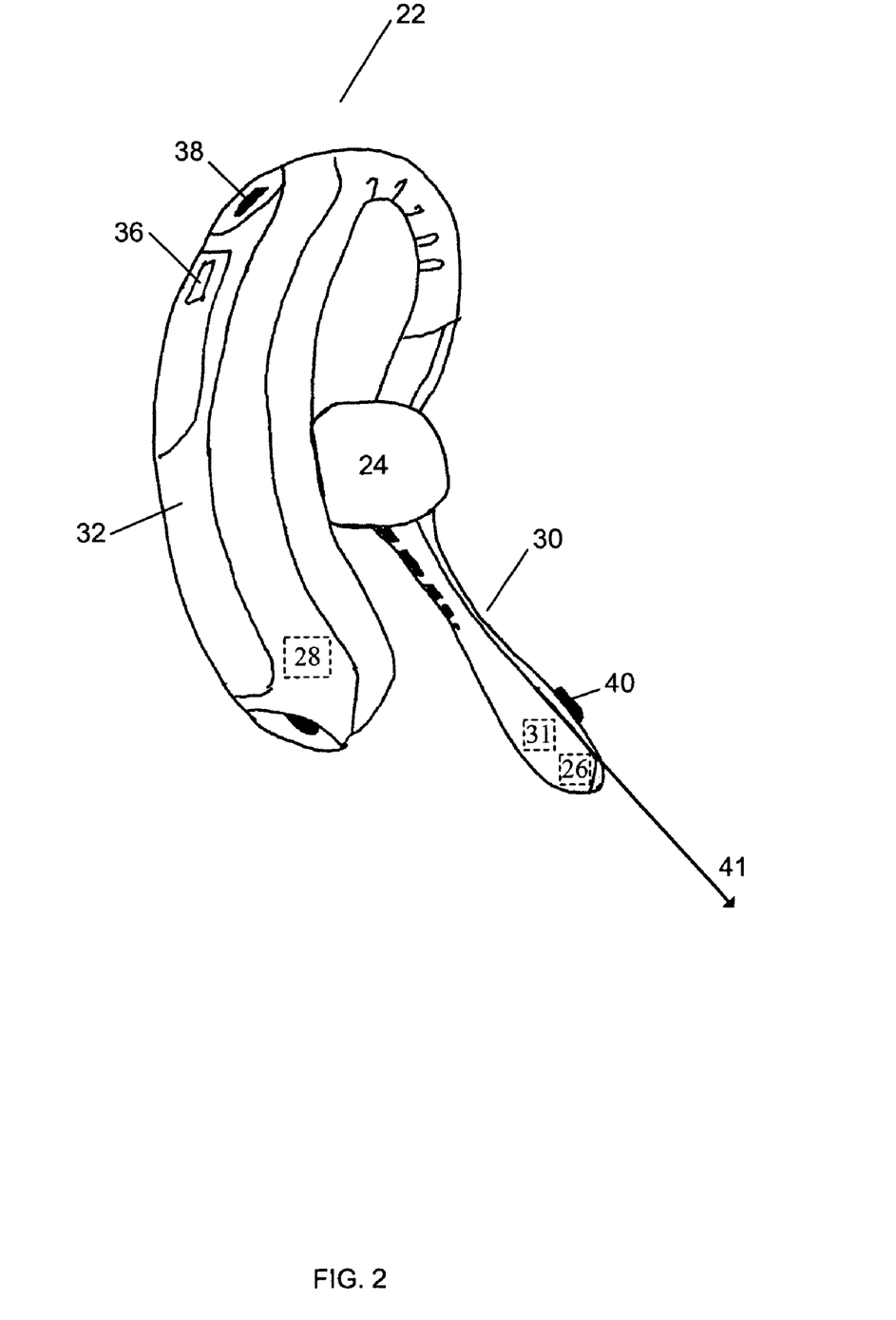
FIG. 2 illustrates a perspective view of one example of a mobile communication device of the invention.

Referring to FIG. 2, a perspective view of a mobile communication device 2 in the form of an over-the-ear headset 22 is illustrated. The headset 22 includes a speaker 24, a microphone 26, a user interface 38, status indicator 36, and a wireless communication module 31 installed within a housing of the headset 22. The term "module" is used interchangeably with "circuitry" herein. The user interface 38 may include a multifunction power, volume, mute, and select button or buttons. Other user interfaces may be included on the headset, such as a link active/end interface 40. It will be appreciated that numerous other configurations exist for the user interface. The particular button or buttons and their locations are not critical to the present invention.

The headset 22 includes a boom 30 with the microphone 26 installed at the lower end of the boom. The main housing of the headset may be in the shape of a loop 32 to be worn behind a user's ear. The headset 22 further includes a power source such as a rechargeable battery 28 installed within the housing.

For example, wireless communication module 31 may be a chip module. Referring again to FIG. 1, target devices 4, 6, 8, 10, and 12 each include a corresponding wireless communication module to allow communication or linking between each target device 4, 6, 8, 10, and 12 and the mobile communication device 2. In a further example, referring to FIG. 4, wireless headset may have a second wireless communication module, the operation of which is described in further detail below.

In one example, mobile communication device 2 and target devices communicate over a personal area network (PAN) via the wireless link established by wireless communication module 31 and a corresponding PAN wireless communication module at each target device. Both the wireless communication module 31 and corresponding wireless communication module at each target device have the capability to transmit and receive signals over the PAN. The PAN may have a limited wireless range. The PAN may use a variety of transmission networks, including radio-frequency networks, optical networks, and an infrared (IR) network. For example, the radio-frequency network could employ Bluetooth, 802.11, or DECT standards based communication protocols.

In one example, wireless communication module 31 communicates over an RF network employing the Bluetooth standard with corresponding Bluetooth modules at the target devices. The Bluetooth specification, version 2.0, is hereby incorporated by reference. A prescribed interface such as Host Control Interface (HCI) is defined between each Bluetooth module. Message packets associated with the HCI are communicated between the Bluetooth modules. Control commands, result information of the control commands, user data information, and other information are also communicated between Bluetooth modules.

Figure 3:
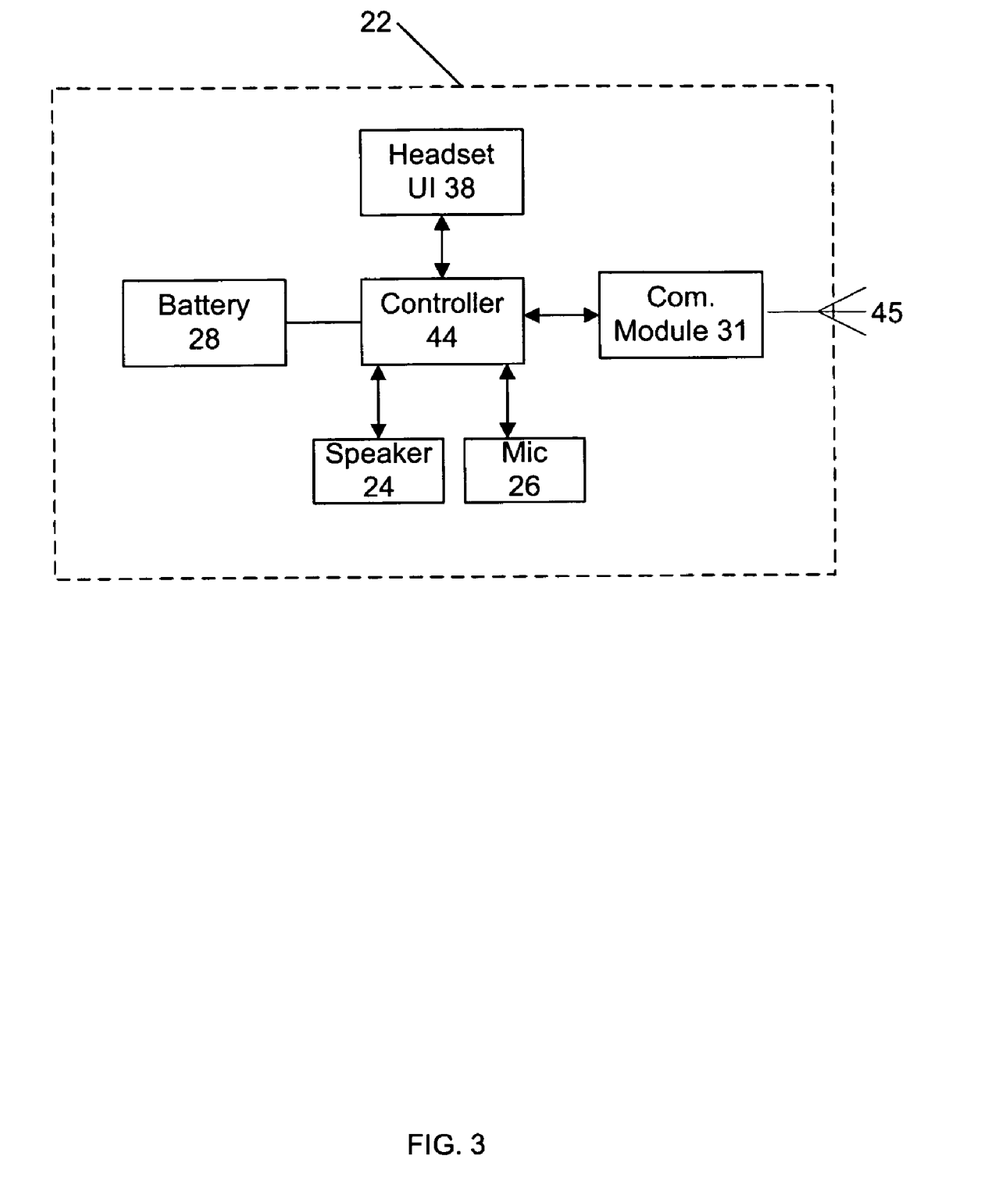
FIG. 3 illustrates a simplified block diagram of the components of the mobile communication device shown in FIG. 2.

FIG. 3 illustrates a simplified block diagram of the components of the headset 22 shown in FIG. 2. Headset 22 may include a headset controller 44 that comprises a processor, memory and software to implement functionality as described herein. The headset controller 44 receives input from headset user interface 38 and manages audio data received from microphone 26 and sent to speaker 24. The headset controller 44 further interacts with wireless communication module 31 to transmit and receive signals between the headset 22 and a target device (not shown) employing comparable communication modules. Wireless communication module 31 includes an antenna 45. Battery 28 provides power to the various components of the headset. In a further example, the wireless communication module 31 may include a controller which controls one or more operations of the headset 22.

Wireless communication module 31 may use a variety of wireless communication technologies. For example, wireless communication module 31 is a Bluetooth, DECT, MI, or IEEE 802.11 communications module configured to provide directionality in the communication link.

Bluetooth, DECT, or IEEE 802.11 communications modules require the use of an antenna for both receive and transmit. In one example, headset 22 employs an antenna system with diversity. For example, the directional antenna may comprise an array of two or more antenna elements. A phase shifter (or beamforming device) attached to each element utilizes a phase angle delay to provide a concentrated antenna beam in the selected direction. Concentrating the beam allows for an increase in antenna gain and range in the desired direction. The directionality of the antenna system may be fixed in alignment with a component of the mobile communication device 2.

Referring to FIG. 2, for example, a beam direction 41 may be directed along the boom 30 of headset 22. The user may establish communication between the headset 22 and a particular desired target device by pointing the boom in the direction of the desired target device. When wearing the headset, the user may orient the pointing direction simply by turning their head to look at the target devices. Other mobile communication devices may allow the user to establish a directional link by pointing at the target device, such as in the example of a wrist-worn mobile communication device.

The diversity antenna system may also operate in a more common diversity mode where the system switches between each individual antenna elements operating in an omnidirectional mode to preferentially select the antenna with the best signal to noise ratio between the available individual antennas. If each of the individual antennas is spaced apart, and the poles are oriented differently, this diversity can produce large differences in individual antenna performance. By selecting the best performing antenna at this time, overall system performance can be greatly increased over single antenna designs. By combining both techniques the diversity can be controlled for directionality in the transmit direction, and to enhance overall receive performance in the receive direction.

In an additional example, wireless communication module 31 accomplishes wireless data communications with target devices utilizing an infrared (IR) interface. The IR interface includes a signal source and signal detector, the components of which are known in the art. The signal source and detectors are configured with a processor which performs processing for converting between IR and electrical signals. Such processing includes amplification and filtering. Optics may be used to focus or disperse the IR beam as desired to provide appropriate directionality and coverage to allow linking between the headset and a desired target device. In this example, wireless communication module 31 provides a directional link allowing a user to establish communication between the headset 22 and a particular desired target device by directing the IR beam in the direction of the desired target device.

Figure 4:
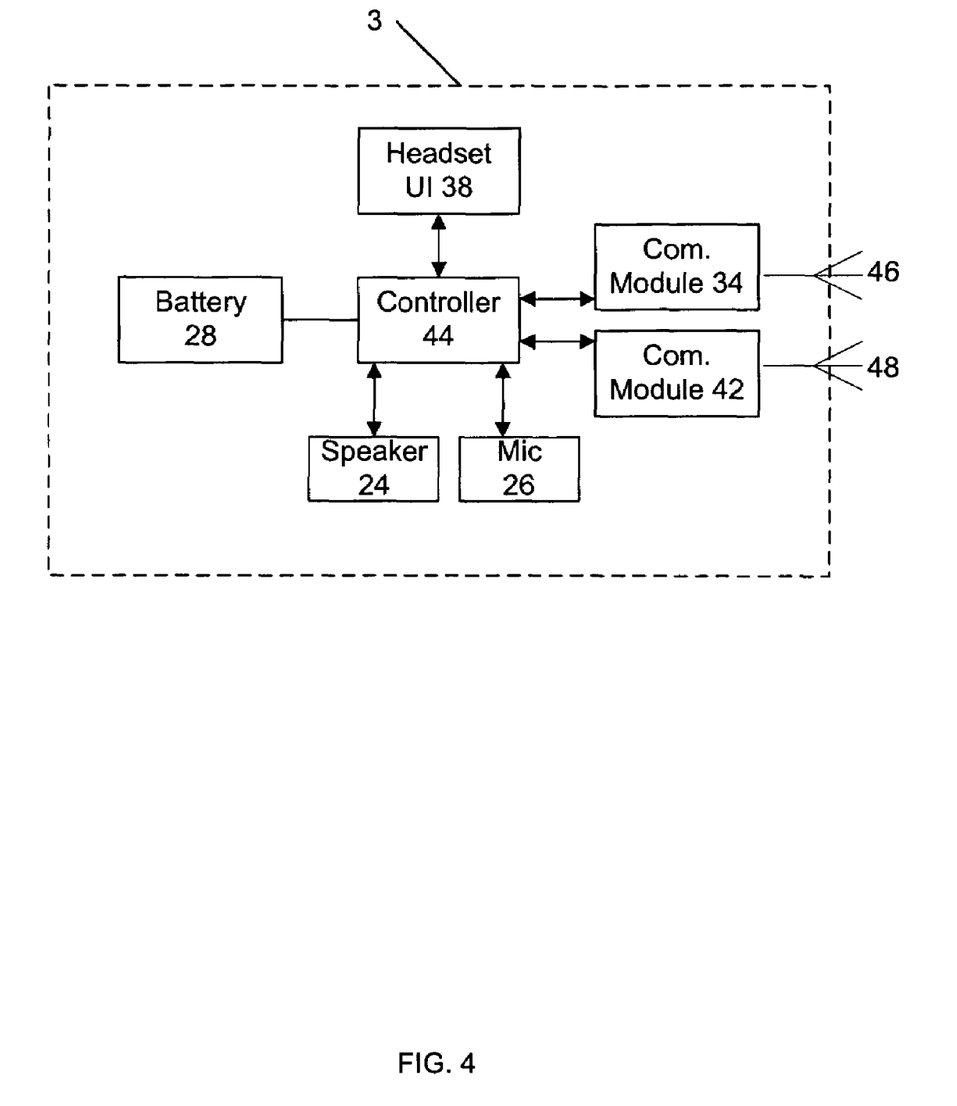
FIG. 4 illustrates a simplified block diagram of the components of the mobile communication device in a further example.

Referring to FIG. 4, an example of a mobile communication device 3 is illustrated. Mobile communication device 3 is similar to that of headset 22 illustrated in FIG. 3 except that it includes two wireless communication modules: local area communication module 34 and local area communication module 42. In one example mode of operation, local area communication module 34 provides a directional communication link to establish communications between the mobile communication device 3 and a desired target device. Once the desired link is established, local area communication module 42 may be utilized to perform additional communications between the mobile communication device 3 and the desired target device. In one example, local area communication module 34 accomplishes wireless data communications with target devices utilizing an infrared (IR) interface. The IR interface is as described above.

In another example, local area communication module 34 includes an antenna 46 and local area communication module 42 includes an antenna 48. Antenna 46 is a directional antenna and antenna 48 is an omnidirectional antenna. Local area communication module 34 is a Bluetooth, DECT, or IEEE 802.11 communications module. In this example, local area communication module 34 provides a directional link allowing a user to establish communication between the headset 22 and a particular desired target device by directing the antenna beam in the direction of the desired target device. Once this link is established, data communications are handed off to local area communication module 34. In further examples, antenna 46 and antenna 48 may utilize diversity antennas to provide additional flexibility.

Figure 5A:
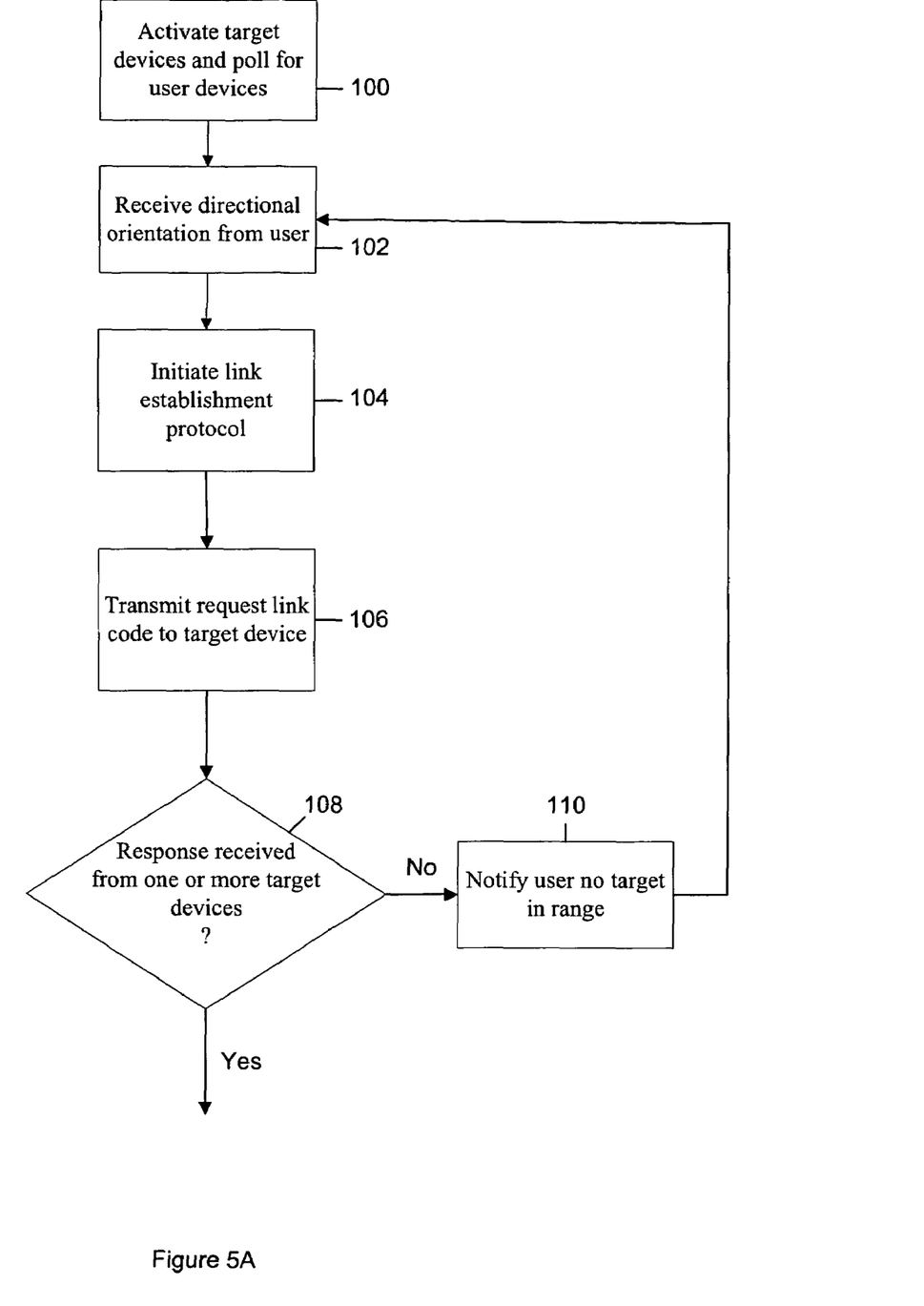
FIGS. 5A and 5B are a flow chart illustrating operation of a mobile communication device.
Figure 5B:
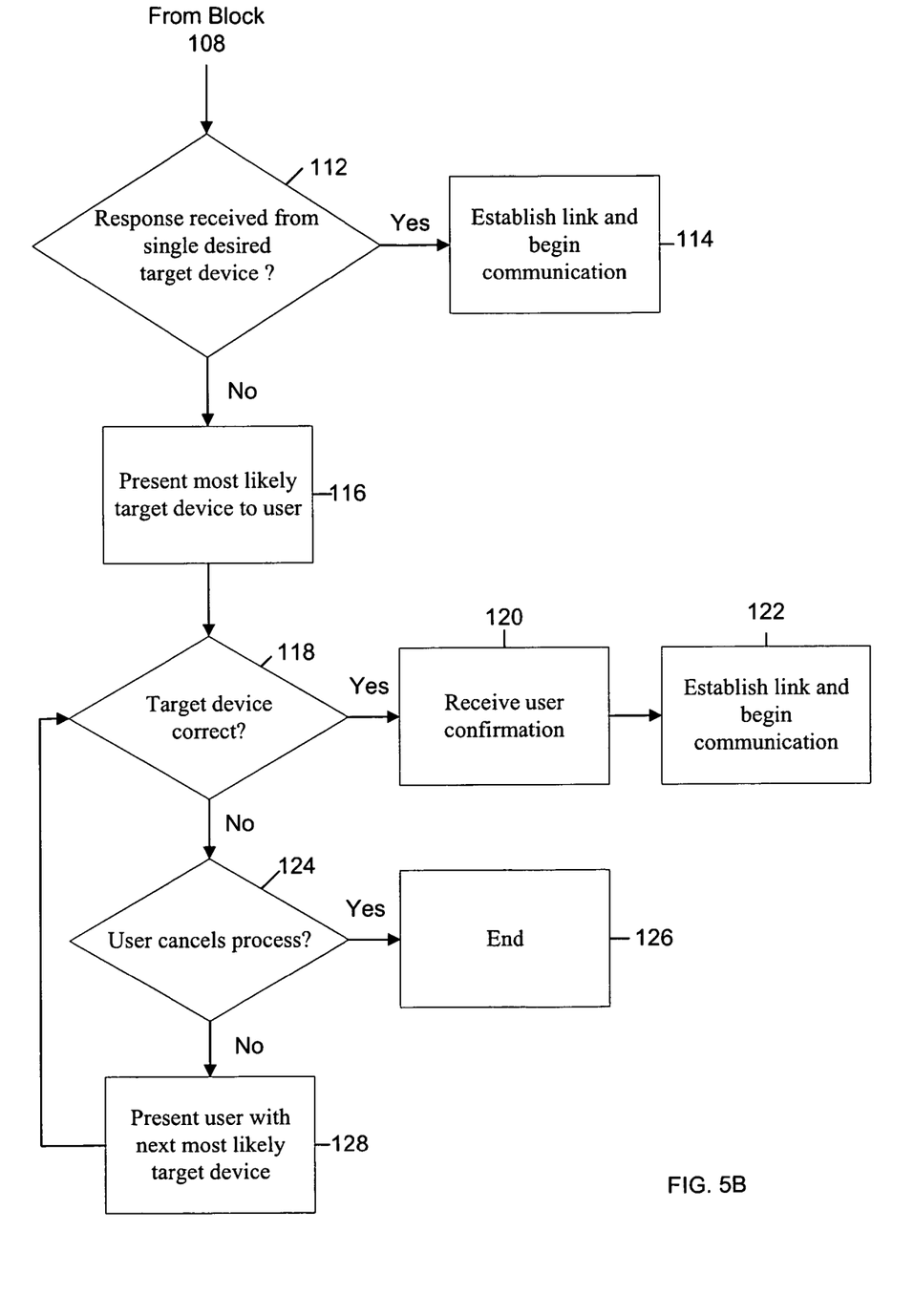

FIG. 5 is a flow chart illustrating operation of a mobile communication device. At block 100, target devices are activated and poll for possible mobile communication devices. Activation and polling are performed in a manner similar to the Bluetooth Device Discovery Procedure as described in the Bluetooth Specification.

At block 102, a mobile communication device receives a directional orientation from a user. For example, the wearer of a headset may turn their head in a particular direction, thereby pointing the boom at a particular target device. At step 104, the user initiates a link establishment protocol. This may be performed using a variety of man-machine interfaces (MMI). For example, a voice command may be used or the user may press a user interface button on the mobile communication device. The link establishment protocol or process has many of the same aspects as other link establishment protocols with the addition of the user selectable directionality aspects. At block 106, the mobile communication device transmits a request link code to the target device. The transmission may be performed with either a directional or omnidirectional transmission. A directional transmission is advantageous in that that the number of target devices receiving the transmission is limited in cases where there are number of target devices in close proximity.

At block 108, the mobile communication device determines whether a response has been received from one or more target devices. If no responses are received within an allotted time frame, at block 110, the user is notified that no targets are in range. For example, a standard earcon can be utilized. The user may adjust the mobile communication device to provide a new directional orientation. If a response is received, at block 112, the mobile communication device determines whether a response has been received from a single target device. If yes, at block 114, a link is established between the mobile communication device and target device and communication begins without additional user intervention. For example, text or voice data may be transferred bi-directionally between the mobile communication device and target device.

If no at block 112, at block 116 the user is presented with the most likely target device. For example, the most likely target device may be determined by the mobile communication device by measuring and comparing received signal strength indication (RSSI) from multiple targets. This information is transmitted to the most likely target device, which informs the user. For example, an indicator light on the target device may light in response to the mobile communication device. At block 118, the user determines if the presented target device is the desired target device. If yes, at block 120, the mobile communication devices receives user confirmation. For example, the confirmation may be received through a MMI input to the mobile communication device. At block 122, a voice input and link is established and communication begins.

If no at block 118, the user rejects the presented device through a MMI such as a voice command. At block 124 the user is presented with the option of canceling the process. If yes at block 124, at block 126 the process ends. If no at block 124, the user is presented with the next most likely target device at block 128. The process then loops back to block 118 until the correct target device is located or the user ends the process. Alternatively, if at block 118 the presented target device is not correct, the user may choose to readjust the directional orientation of the mobile communication device or make other adjustments and restart the loop at block 104.

In one example mode of operation, the mobile communication devices described herein are used in an automated shopping environment. A user wears a headset as he or she travel up and down the aisles of a store. Integrated into the shelves of the store is an automated information system containing the product and pricing information on the merchandise. This information is transmitted to the user's headset, and the user can then interact with the information system through voice commands. There is a plurality of shelves carrying merchandise, with many users interacting with the system simultaneously. The user may walk or ride up and down the aisles, simply look at the merchandise and the link between the user's headset and the display is made automatically.

The various examples described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such changes may include, but are not necessarily limited to: location of wireless communication modules or other components of the mobile communication device; number, placement, and functions performed by the user interface; wireless communication technologies or standards to perform the directional communication link between the mobile communication device and target devices. Furthermore, the shapes and sizes of the illustrated mobile communication device housing and components may be altered. In particular, various antenna designs and configurations may be used in additional examples of the invention. Such modifications and changes do not depart from the true spirit and scope of the present invention that is set forth in the following claims.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A mobile communication device comprising:
   a housing forming a headset, the housing comprising a boom;
   a speaker;
   a microphone;
   a first radio frequency wireless communication module capable of directional communications, wherein the first radio frequency wireless communication module comprises a directional antenna with an antenna beam direction correlated with the boom, and wherein the first radio frequency wireless communication module establishes a preliminary first communications link with a target device selected from a plurality of potential target devices by comparing RSSIs received from a plurality of potential target devices; and a second radio frequency wireless communication module capable of omni-directional communications, wherein the second radio frequency wireless communication module establishes a second subsequent communications link with the target device in place of the preliminary first communications link, the second subsequent communications link established responsive to establishment of the preliminary first communications link.

2. The mobile communication device of claim 1, wherein the second radio frequency wireless communication module utilizes the Bluetooth standard.

3. The mobile communication device of claim 1, wherein the second radio frequency wireless communication module utilizes the IEEE 802.11 or DECT standard.

4. The mobile communication device of claim 1, wherein the first wireless communication module communicates over a personal area network.

5. The mobile communication device of claim 1, wherein the directional antenna comprises an array of two or more antenna elements.

6. The mobile communication device of claim 1, further comprising a voice-based user interface for initiating the preliminary first communications link.

7. The mobile communication device of claim 1, wherein the directional antenna is a component of a diversity antenna.

8. The mobile communication device of claim 1, wherein the mobile communication device further comprises an omni-directional antenna.

9. The mobile communication device of claim 1, wherein the first radio frequency wireless communication module utilizes the Bluetooth standard, IEEE 802.11 standard, or DECT standard.

10. The mobile communication device of claim 1, further comprising a user interface to receive a user command to link with the target device.

11. The mobile communication device of claim 1, wherein the plurality of target devices are networked electronic devices capable of transmitting voice or text data.

* * * * *